United States Patent
Xie

(10) Patent No.: US 8,269,142 B2
(45) Date of Patent: Sep. 18, 2012

(54) WELD CURRENT GENERATING APPARATUS

(75) Inventor: Ling-Yu Xie, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 287 days.

(21) Appl. No.: 12/774,743

(22) Filed: May 6, 2010

(65) Prior Publication Data

US 2011/0168684 A1    Jul. 14, 2011

(30) Foreign Application Priority Data

Jan. 13, 2010    (CN) .......................... 2010 1 0300244

(51) Int. Cl.
*B23K 9/10*    (2006.01)

(52) U.S. Cl. .................................................. 219/130.1
(58) Field of Classification Search ................ 219/130.1
See application file for complete search history.

(56) References Cited

U.S. PATENT DOCUMENTS

| | | | |
|---|---|---|---|
| 6,321,167 B1* | 11/2001 | Jochi et al. ...................... | 702/60 |
| 2001/0054603 A1* | 12/2001 | Watanabe ...................... | 219/110 |
| 2005/0272388 A1* | 12/2005 | Giacaman ...................... | 455/205 |

* cited by examiner

*Primary Examiner* — Hoai V Ho
(74) *Attorney, Agent, or Firm* — Altis Law Group, Inc.

(57) ABSTRACT

A weld current generating apparatus includes a voltage conversion circuit, a control circuit, and a charge/discharge circuit. The voltage conversion circuit receives an AC voltage from an AC voltage input terminal and converts the AC voltage to a DC voltage. The control circuit receives the DC voltage and outputs control signals. The charge/discharge circuit receives the DC voltage and is charged by the DC voltage or discharged according to the control signals. The charge/discharge circuit outputs a continuous weld current during discharging process.

12 Claims, 2 Drawing Sheets

WELD CURRENT GENERATING APPARATUS

BACKGROUND

1. Technical Field

The present disclosure relates to a current generating apparatus, and particularly to a weld current generating apparatus.

2. Description of Related Art

The alloys used to form thermocouples are generally welded together with the use of expensive equipment that provides a high current for the welding process. A simple inexpensive apparatus is desired to overcome the above problem.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
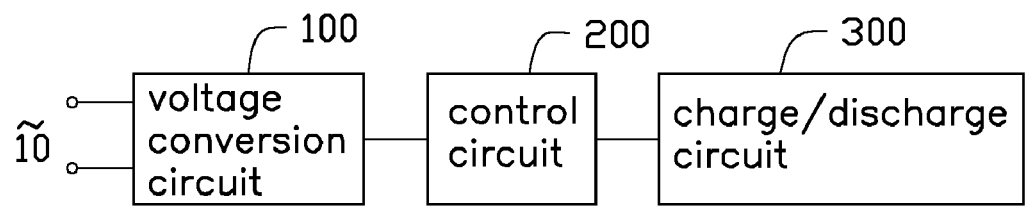
FIG. 1 is a block view of an embodiment of a weld current generating apparatus.

Referring to FIG. 1, a weld current generating apparatus in an embodiment includes a voltage conversion circuit 100, a control circuit 200, and a charge/discharge circuit 300. The voltage conversion circuit 100 receives an AC voltage from an AC voltage input terminal 10 and converts the AC voltage to a DC voltage which provides working voltage to the control circuit 200 and charge/discharge circuit 300. The control circuit 200 controls the DC voltage to charge the charge/discharge circuit 300. The control circuit 200 controls the charge/discharge circuit 300 to discharge and generate a weld current at the charge/discharge circuit 300 output terminal.

Figure 2:
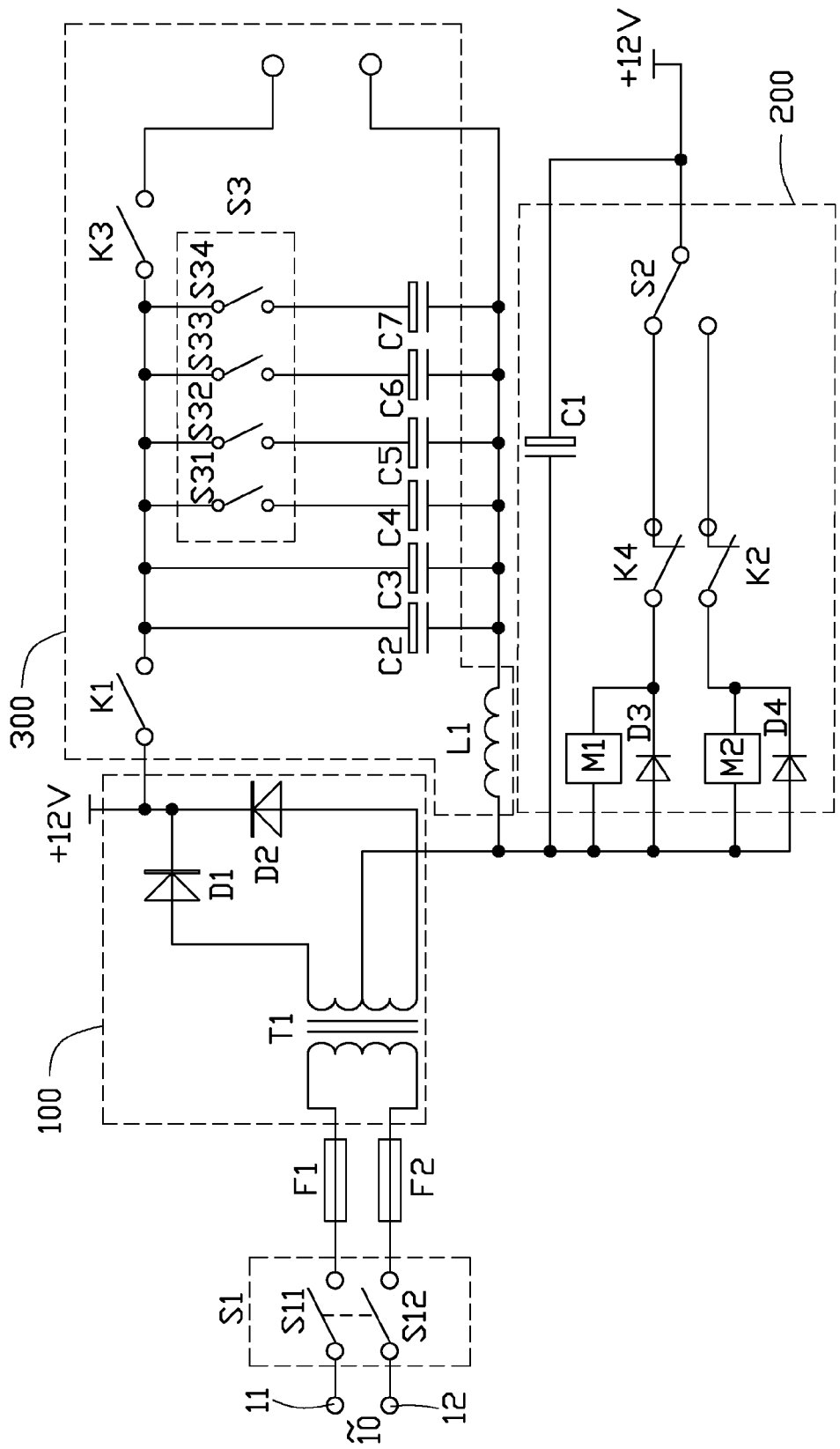
FIG. 2 is a circuit view of the weld current generating apparatus of FIG. 1.

Referring to FIG. 2, the weld current generating apparatus further includes a linked switch 51 and fuses F1, F2. The linked switch 51 includes switches S11, S12. The AC voltage input terminal 10 includes a live wire terminal 11 and a naught wire terminal 12. The live wire terminal 11 is electrically coupled to a first terminal of the fuse F1 via the switch S11. The naught wire terminal 12 is electrically coupled to a first terminal of the fuse F2 via the switch S12. The voltage conversion circuit 100 includes a transformer T1 and diodes D1, D2. The transformer T1 includes a first input terminal, a second input terminal, a first output terminal, a second output terminal, and a ground terminal. The first input terminal is electrically coupled to a second terminal of the fuse F1. The second input terminal is electrically coupled to a second terminal of the fuse F2. The first and second output terminals are electrically coupled to anodes of the diodes D1, D2 respectively. Cathodes of the diodes D1, D2 are electrically coupled together to output the DC voltage. In one embodiment, the DC voltage is +12 volts.

The control circuit 200 includes a first relay, a second relay, a multiple switch S2, diodes D3, D4, and a capacitor C1. The first relay includes a winding M1, a first normally open contact K1, and a first normally closed contact K2. The second relay includes a winding M2, a second normally open contact K3, and a second normally closed contact K4. The multiple switch S2 includes a first terminal, a second terminal, and a third terminal. The first terminal of the multiple switch S2 receives the 12 volts DC voltage. The first terminal of the multiple switch S2 is electrically coupled to the ground terminal via the capacitor C1. The second and third terminals of the multiple switch S2 are electrically coupled to the ground terminal via the windings M1, M2 respectively. The diodes D3, D4 are parallel coupled with the windings M1, M2 respectively. A cathode of the diode D3 is electrically coupled to the second terminal of the multiple switch S2 via the second normally closed contact K4. A cathode of the diode D4 is electrically coupled to the third terminal of the multiple switch S2 via the first normally closed contact K2.

The charge/discharge circuit 300 includes capacitors C2~C7, an inductor L1, and a combination switch S3. The combination switch S3 includes switches S31~S34. First terminals of the capacitors C2, C3 receive the 12 volts DC voltage via the normally open contact K1 respectively. Second terminals of the capacitors C2, C3 are electrically coupled to the ground terminal via the inductor L1 respectively. First terminals of the capacitors C4~C7 are electrically coupled to a first terminal of the second normally open contact K3 via the switches S31~S34 respectively. Second terminals of the capacitors C4~C7 are electrically coupled to the ground terminal via the inductor L1 respectively. The weld current is generated from a second terminal of the second normally open contact K3 to the second terminals of the capacitors C2~C7.

In an active state, the switches S11, S12 are turned on. The AC voltage is converted to a +12 volts DC voltage which provides working voltage to the control circuit 200 and charge/discharge circuit 300. The multiple switch S2 is pressed to close its first and second terminals. The winding M1 is powered on. The normally open contact K1 is closed and the first normally closed contact K2 is opened. The +12 volts DC voltage charges the capacitors C2~C7 via the normally open contact K1. When the charge/discharge circuit 300 capacitors are fully charged, the multiple switch S2 is pressed to close its first and third terminals. The winding M1 is powered off. The normally open contact K1 is opened and the first normally closed contact K2 is closed again. The winding M2 is powered on. The second normally open contact K3 is closed and the second normally closed contact K4 is opened. The charge/discharge circuit 300 capacitors generate a weld current of high power from the second terminal of the second normally open contact K3 to the second terminals of the capacitors.

In one embodiment, the capacitors C4~C7 used with the switches S31~S34 respectively are optional according to a strength of the weld current required. During the weld process, the first and second normally closed contacts K2, K4 form an interlocking switch. The interlocking switch prevents the first and second normally open contacts K1, K3 being closed at the same time should the windings M1, M2 malfunction. Therefore charging and discharging the capacitors of the charge/discharge circuit 300 at the same time is avoided. And the capacitors of the charge/discharge circuit 300 are protected.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A weld current generating apparatus, comprising:
a voltage conversion circuit capable of receiving an AC voltage from an AC voltage input terminal and converting the AC voltage to a DC voltage;
a control circuit capable of receiving the DC voltage and outputting control signals; and
a charge/discharge circuit capable of receiving the DC voltage and being charged by the DC voltage or discharged according to the control signals; wherein the charge/discharge circuit is capable of outputting a continuous weld current during discharging process; wherein the voltage conversion circuit comprises a transformer; the transformer comprises a ground terminal; the control circuit comprises a first winding, a second winding, and a multiple switch; the multiple switch comprises a first terminal, a second terminal, and a third terminal; the first terminal of the multiple switch is capable of receiving the DC voltage; and the second and third terminals of the multiple switch are electrically coupled to the ground terminal via the first and second windings respectively.

2. The weld current generating apparatus of claim 1, further comprising a linked switch, a first fuse, and a second fuse; the linked switch comprises a first switch and a second switch; the AC voltage input terminal comprises a live wire terminal and a naught wire terminal; the live wire terminal is electrically coupled to a first terminal of the first fuse via the first switch; and the naught wire terminal is electrically coupled to a first terminal of the second fuse via the second switch.

3. The weld current generating apparatus of claim 2, wherein the voltage conversion circuit further comprises a first diode, and a second diode; the transformer further comprises a first input terminal, a second input terminal, a first output terminal, and a second output terminal; the first input terminal is electrically coupled to a second terminal of the first fuse; the second input terminal is electrically coupled to a second terminal of the second fuse; the first and second output terminals are electrically coupled to anodes of the first and second diodes respectively; and cathodes of the first and second diodes are electrically coupled together to output the DC voltage.

4. The weld current generating apparatus of claim 3, wherein the charge/discharge circuit comprises at least a first capacitor, a second capacitor, a combination switch, a first normally open contact and a second normally open contact; the combination switch comprises at least a third switch; a first terminal of the first normally open contact is capable of receiving the DC voltage; a second terminal of the first normally open contact is electrically coupled to the ground terminal via the first capacitor; the second terminal of the first normally open contact is electrically coupled to the ground terminal via the third switch and the second capacitor in series; the second terminal of the first normally open contact is electrically coupled to a first terminal of the second normally open contact; and the weld current is generated from a second terminal of the second normally open contact to the ground terminal.

5. The weld current generating apparatus of claim 1, wherein the control circuit further comprises a first normally closed contact and a second normally closed contact; and the second and third terminals of the multiple switch are electrically coupled to the first and second windings via the second normally closed contact and the first normally closed contact respectively.

6. The weld current generating apparatus of claim 5, wherein the control circuit further comprises a third diode and a fourth diode; the third and fourth diodes are parallel coupled with the first and second windings respectively; anodes of the third and fourth diodes are electrically coupled to the ground terminal; a cathode of the third diode is electrically coupled to the second terminal of the multiple switch via the second normally closed contact; and the second diode cathode is electrically coupled to the multiple switch third terminal via the first normally closed contact.

7. A weld current generating apparatus, comprising:
a voltage conversion circuit capable of receiving an AC voltage from an AC voltage input terminal and converting the AC voltage to a DC voltage;
a control circuit capable of receiving the DC voltage and outputting control signals; and
a charge/discharge circuit capable of receiving the DC voltage and being charged by the DC voltage or discharged according to the control signals; wherein the charge/discharge circuit comprises at least a first capacitor, a second capacitor, and a combination switch, a first normally open contact and a second normally open contact; the combination switch comprises at least a third switch; a first terminal of the first normally open contact is capable of receiving the DC voltage; a second terminal of the first normally open contact is electrically coupled to the ground terminal via the first capacitor; the second terminal of the first normally open contact is electrically coupled to the ground terminal via the third switch and the second capacitor in series; the second terminal of the first normally open contact is electrically coupled to a first terminal of the second normally open contact; and a continuous weld current is generated from a second terminal of the second normally open contact to the ground terminal discharging process.

8. The weld current generating apparatus of claim 7, further comprising a linked switch, a first fuse, and a second fuse; the linked switch comprises a first switch and a second switch; the AC voltage input terminal comprises a live wire terminal and a naught wire terminal; the live wire terminal is electrically coupled to a first terminal of the first fuse via the first switch; and the naught wire terminal is electrically coupled to a first terminal of the second fuse via the second switch.

9. The weld current generating apparatus of claim 8, wherein the voltage conversion circuit comprises a transformer, a first diode, and a second diode; the transformer comprises a first input terminal, a second input terminal, a first output terminal, and a second output terminal; the first input terminal is electrically coupled to a second terminal of the first fuse; the second input terminal is electrically coupled to a second terminal of the second fuse; the first and second output terminals are electrically coupled to anodes of the first and second diodes respectively; and cathodes of the first and second diodes are electrically coupled together to output the DC voltage.

10. The weld current generating apparatus of claim 7, wherein the control circuit comprises a first winding, a second winding, and a multiple switch; the multiple switch comprises a first terminal, a second terminal, and a third terminal; the transformer comprises a ground terminal; the first terminal of the multiple switch is capable of receiving the DC voltage; and the second and third terminals of the multiple switch are electrically coupled to the ground terminal via the first and second windings respectively.

11. The weld current generating apparatus of claim 10, wherein the control circuit further comprises a first normally closed contact and a second normally closed contact; and the second and third terminals of the multiple switch are electrically coupled to the first and second windings via the second normally closed contact and the first normally closed contact respectively.

12. The weld current generating apparatus of claim 11, wherein the control circuit further comprises a third diode and a fourth diode; the third and fourth diodes are parallel coupled with the first and second windings respectively; anodes of the third and fourth diodes are electrically coupled to the ground terminal; a cathode of the third diode is electrically coupled to the second terminal of the multiple switch via the second normally closed contact; and the second diode cathode is electrically coupled to the multiple switch third terminal via the first normally closed contact.

\* \* \* \* \*